United States Patent [19]

Shelton

[11] 4,360,036
[45] Nov. 23, 1982

[54] THERMOSTATIC SELF-POWERED DRAIN VALVE

[76] Inventor: Russell S. Shelton, 9 Park Ave., Flanders, N.J. 07836

[21] Appl. No.: 269,797

[22] Filed: Aug. 24, 1981

[51] Int. Cl.³ .................... E03B 7/12; F16K 31/38
[52] U.S. Cl. ............................ 137/61; 137/62; 137/107; 137/625.26; 237/80; 251/43; 251/325
[58] Field of Search ................. 137/59, 60, 61, 62, 137/79, 301, 302, 107, 218, 625.66, 625.26; 251/11, 44, 62, 63, 63.5, 28, 325, 43; 237/80

[56] References Cited

U.S. PATENT DOCUMENTS

| | | | |
|---|---|---|---|
| 629,794 | 8/1899 | Lindsay | 137/61 |
| 1,141,975 | 6/1915 | Osborne | 251/28 |
| 1,306,186 | 6/1919 | Kidder | 137/62 |
| 1,526,718 | 2/1925 | Opp | 137/60 |
| 2,118,299 | 5/1938 | Ellis | 137/79 |
| 2,620,816 | 12/1952 | Griswold | 137/218 |
| 3,074,433 | 1/1963 | Stark | 137/625.26 |
| 3,227,179 | 1/1966 | Roasen | 137/625.26 |
| 3,391,711 | 7/1968 | Wade | 137/625.26 |
| 3,522,821 | 8/1970 | Komendera | 137/625.26 |
| 3,580,280 | 5/1971 | Reis | 137/625.66 |
| 3,780,763 | 12/1973 | Wisniewski | 251/43 |
| 3,877,484 | 4/1975 | Theriot et al. | 137/625.66 |
| 3,961,606 | 6/1976 | Wong | 251/11 |
| 4,165,035 | 8/1979 | Maltby | 137/625.26 |
| 4,243,062 | 1/1981 | Shelton | 137/62 |

Primary Examiner—George L. Walton
Attorney, Agent, or Firm—Roy M. Porter, Jr.

[57] ABSTRACT

A water or other fluid containing system is protected by a thermostatically controlled drain valve having input, output, drain and control ports. A slideable barrier within the valve selectively directs the flow within the valve between the ports. A small coupling orifice through the barrier and a particularly designed closure for the orifice are provided. A thermosensitive mechanism delivers pressure to the control port to open this closure when ambient temperature drops below a predetermined level. Equal static pressures developed by flow through the orifice in turn develop unequal forces on opposite sides of the barrier, to shift the barrier, redirecting the flow within the valve.

7 Claims, 3 Drawing Figures

THERMOSTATIC SELF-POWERED DRAIN VALVE

RELATED PATENT

A similar thermostatically controlled value is disclosed in my U.S. Pat. No. 4,243,062 granted Jan. 6, 1981.

BACKGROUND OF THE INVENTION

The prior art has recognized the need for thermostatically controlled hydraulic drain valves for draining water systems in buildings and equipment to prevent breakage due to freezing. Typically, these drain valves are powdered by as springtrip mechanism or by an expandable bellows mechanism. Another type of valve considered by the prior art requires a thermostat and a source of external electrical power.

In my prior patent hereinbefore identified, I disclose how unique advantage can be taken of hydraulic pressure to provide a thermostatically controlled valve that is powered by the hydraulic pressure itself and requires no external power or complicated or unreliable springtrip or bellows mechanisms. More particularly, a valve body having an input, output and drain port is provided with a slideable barrier retained within the valve body and suitably adapted to couple the input and output ports and to close the drain port in one position, and to couple the output port to the drain port and close the input in another position. A small coupling orifice which by-passes the barrier allows equal hydraulic pressures to develop on opposite sides of the barrier under static conditions. This orifice acts in combination with thermally sensitive means for relieving the pressure on one side to move the barrier in the direction of the relieved pressure thereby reversing the coupling between the ports.

SUMMARY OF THE INVENTION

In accordance with the present invention, the general principles in my prior patent are extended to a valve activated by a positive pressure derived by the thermally sensitive means directly from the system pressure rather than by a relieved pressure as in my patent. In general, the input, output, drain and control parts together with the slideable barrier body having an orifice are retained in modified form. In accordance with the invention, a particularly designed closure for the orifice through the barrier body is provided. A small pressure delivered to the control port opens this closure, which in turn delivers system pressure to both sides of the barrier. A feature of the invention resides in the relative cross-sectional areas of the opposite sides of the barrier by means of which unequal forces are developed by the delivered pressure upon these opposite sides to move the barrier thereby reversing the coupling between the ports.

DETAILED DESCRIPTION OF THE PREFERRED EMBODIMENT

Figure 1:
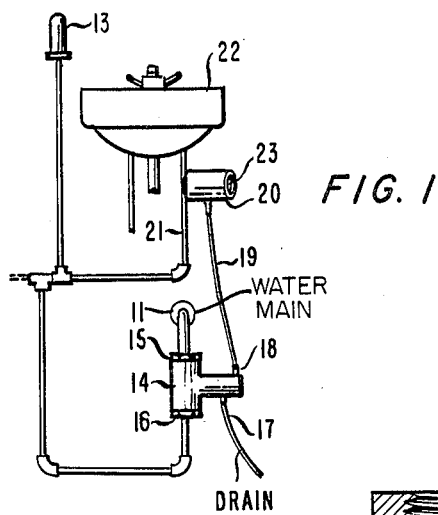
FIG. 1 is a schematic diagram of a water system and shows a temperature sensitive valve and a valve inaccordance with the invention.

Referring more particularly to FIG. 1, a protected water system in accordance with the present invention is shown including a connection 11 to the water main, a connection 12 leading to the water using fixtures to be protected. The conventional water system is completed by an air relief valve 13 of standard construction located at a suitably high point in the system which allows air to enter the system to replace water being drained out.

Figure 2:
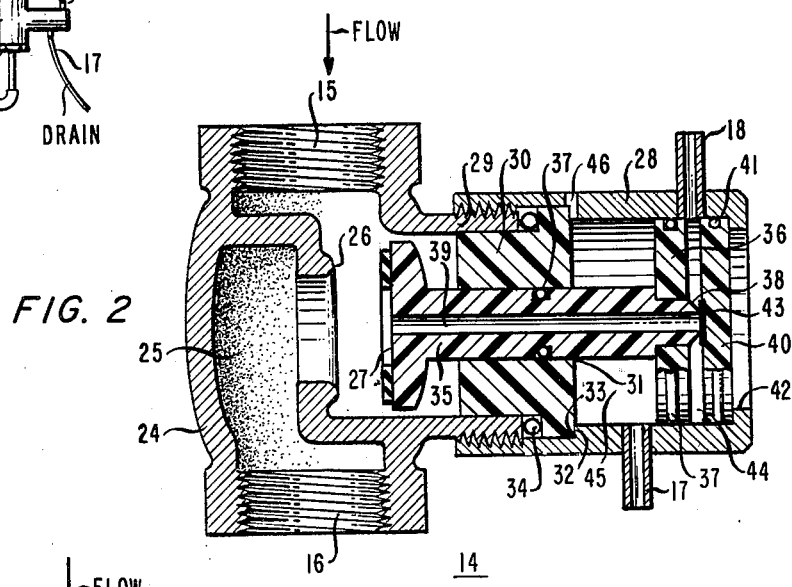
FIG. 2 is a cutaway cross-sectional view of the valve of FIG. 1 in its open position.
Figure 3:
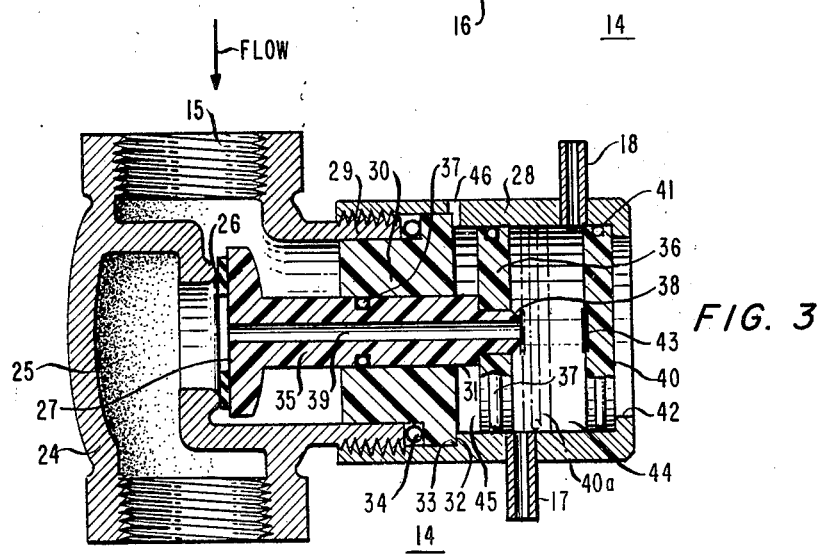
FIG. 3 is a cutaway cross-sectional view of the valve of FIG. 2 in its drain position.

Interposed between main 11, as close thereto as practical, and the water system to be protected is a thermostatically controlled valve 14 in accordance with the invention. Details of valve 14 are shown in FIGS. 2 and 3 and will be described in detail hereinafter. For the moment, it should be noted that valve 14 includes a port 15 connected to water main 11, a port 16 connected to the plumbing system to be protected, and a drain port 17 which preferably, but not necessarily, is connected to the sewer. A control port 18 from valve 14 is connected by a small tube 19 of metal or plastic to the output port 23 of remotely located temperature sensitive or thermostatic capsule 20.

The purpose of the thermostatic capsule 20 is to detect an abnormal drop in temperature, interpret this drop as meaning that there has been a heating failure, and start the sequence to be described in order to drain the system pipes before the temperature drops through the freezing level. Thus, it may be necessary to place the capsule 20 via tube 19 in an area remote from valve 14 where the ambient temperature will reflect the desired conditions. Depending upon the structure to be protected, this location could be near the boiler, in a historically cold room or any other place in the structure. In addition, multiple capsule (20) may be located in different areas and connected to valve 14. An input port to thermostatic capsule 20 is connected to one of the supply pipes 21 of a protected fixture 22.

The nature and function of capsule 20 are the subject matter of my copending application Ser. No. 06-175-123 filed Aug. 4, 1980 and my U.S. Pat. No. 4,243,062 granted Jan. 6, 1981, and reference may be had thereto for further details. Briefly, thermostatic capsule 20 includes a bimetal disc 23 having the property of snapping sharply from one configuration to another at a temperature critically determined by the construction of the disc. In its high temperature configuration the disc blocks the flow of water between pipe 21 to tube 19. When the temperature drops below a predetermined temperature slightly above freezing, the disc opens to permit flow from pipe 21 to tube 19. Obviously, other forms of thermostatic valves may be used in the place of my prior invention with an accompanying loss of the advantages of its particular features. Referring now to FIG. 2, the details of the drain valve 14 are shown with input, output and control ports, respectively corresponding to those in FIG. 1, designated by corresponding reference numerals. Valve 14, shown in its open position, comprises a valve body 24 of brass, aluminum, or other material. Body 24 has a main channel 25 communicating between input port 15 and output port 16 including a valve seat 26 of conventional construction adapted to receive valve closure 27, the closing face of which may be covered by resilient material to form a washer. The relationship between closure 27 and seat 26 is such that when the valve is closed, input pressure from port 15 tends to hold closure 27 upon set 26.

Features of the present invention reside in the valve stem assembly enclosed in cylinder 28 which is attached by threaded means 29 to the side of body 24. Obviously, the two part threaded assembly is of convenient design, but body 24 and cylinder 28 could be integrally formed as a single enclosure or cavity. The valve stem assembly includes a valve stem guide 30 in the form of a hollow cylinder having a uniform internal bore 31 and a shoulder 32 upon its outer diameter. Shoulder 32 is rigidly held, when threads 29 are engaged, against an annular chamfer 33 formed internally of cylinder 28. An "O" ring 34 simultaneously seals between body 24, threads 29 and cylinder 28. Guide 30 could, however, be formed integrally with cylinder 28 or integrally with both cylinder 28 and valve body 24. Valve stem 35, which extends at one of its ends from valve closure 27, is slideably received within bore 31, and carries piston 36 at its other end. "O" rings 37 respectively received in small annular recesses in stem 35 and piston 36, seal stem 35 to guide 30 and piston 36 to cylinder 28.

A small axial bore 39, forming an orifice, extends through closure 27, stem 35 and piston 36. An end plate 40 is slideably received within cylinder 28 and sealed thereto by "O" ring 41 in an annular recess in the circumference of plate 40. End plate 40 is restrained within cylinder 28 by inwardly directed shoulder 42 on cylinder 28 at the remote limit of slide of plate 40.

In accordance with one feature of the invention the relationship between end plate 40 and orifice 39 in piston 36 is such that the orifice is sealed closed when the valve stem assembly is in the fully open position and the orifice is open for a position of the valve stem assembly intermediate between fully open and fully closed. As illustrated, a raised ring or lip 38 is formed around orifice 39 which reacts against a pad 43 of resilient material carried on end plate 40. Other forms of closure could of course be designed, such as a ground seat formed in piston 36 around orifice 39 to be closed by a protuberance carried on plate 40. In either case the closure defines the minimum length of piston chamber 44 between piston 36 and plate 40. Control port 18 is introduced through the wall of cylinder 28 at the location of chamber 44, ie, between piston 36 and plate 40. Drain port 17 couples into a chamber 45, defined between piston 36 and stem guide 30, preferably although not necessarily, at a location diametrically opposite port 28, and preferably although not necessarily, on the under side of chamber 45.

Note that both the back and front surfaces of closure 27, in the position shown in FIG. 2, are exposed to opposing fluid pressures within channel 25. However, since the area of the back surface thereof is reduced by the area of stem 35, the force upon this surface is less than upon the front surface. Thus, the net force upon closure 27 is in the direction to hold the valve open and is proportional to its net effective area, ie, the area of cross-section of stem 35. Piston 36 on the other hand is exposed to the pressure in cavity 44 only upon its front surface and this pressure is in the direction to close the valve. In accordance with the invention, the area of piston 36 is large compared to the net effective area of closure 37, as defined above, so that a large pressure in chamber 25 can be overcome by a small pressure in chamber 44 to cause stem 35 to move toward the closed position.

Referring now to FIG. 3 taken together with FIG. 2, the operation of the valve in accordance with the invention will be defined. Assume that the initial conditions in a normally open valve as in FIG. 2 include capsule 20 closed by disc 23, atmospheric pressure in chambers 44 and 45, and main pressure in chamber 25. The pressure in chamber 25 acting upon the surfaces of closure 27 will hold the valve in this open condition as explained hereinbefore. Bore 39 will be firmly held against pad 43.

Assume that the ambient temperature to which thermostatic capsule 20 is exposed now drops to the temperature at which disc 23 opens the coupling of system pressure in supply pipe 21 into tube 19. Since tube 19 is long and small, there will be a substantial pressure drop along its length. Nevertheless, some small pressure is coupled into cavity 44. Since the area of piston 36 is large compared to the net effective area of closure 27 as defined herebefore, the net force of even this small pressure is such as to begin to move stem 35 toward the closed position. As bore 39 moves away from pad 43, back pressure in channel 25 from the protected system (acting initially together with main pressure) now enters cavity 44 via bore 39, rapidly filling cavity 44 and rapidly completing the movement of the entire stem assembly to that shown in FIG. 3, shutting the supply from the main. Piston 36 now exposes drain 17 to cavity 44 which in turn drains the protected system via bore 39. Note that main pressure acting on the back side of closure 27 holds the valve in the closed position even though pressure from the protected system, acting on piston 36, now drops to zero. The valve will remain closed until reset as now to be described.

To reset the system thermostatic capsule 20 is first closed according to its design, if not of design that closes automatically when a safe temperature is reached. End plate 40 is then pushed into cylinder 28 until pad 43 rests upon and closes bore 39. The end plate in this position is shown in phantom as 40a in FIG. 3. It will now be observed that a slot 46, not previously mentioned, is located through the wall of cylinder 28 entering into cavity 46 at a location adjacent the closed position of piston 36. (This location is not exposed to fluid pressure in either the open or closed conditions.) A suitable tool such as a screwdriver is inserted through slot 46 to pry piston 36 fractionally toward its open position and lift valve closure 27 slightly from seat 26. Main pressure builds within the protected system and within cavity 25 which soon forces valve closure 27 rapidly into the full open position. During this operation, the friction of "O" ring 41 restrains end plate 40 and pad 43 against bore 39 so that no fluid leaks into cavity 44 to oppose the opening force.

Having thus described the components as they are assembled according to a preferred embodiment and the detailed operation of this embodiment, a less specific view of the present invention may now be taken.

Recognize that body 24, cylinder 28, end plate 40 and guide 30 together comprise an enclosure having an input port, an output port, a control port and a drain port opening into the enclosure. Further, recognize that the valve stem assembly comprising closure 27, valve stem 35, piston 36 and the various seals together comprise a barrier slideably retained within the enclosure for coupling a path between the input and output ports and for isolating the drain port and the control port in one position and for coupling a second path between the output port and the drain port and isolating the input port in a second position. Further, the effective exposed cross-sectional area of the closure 27 portion of the barrier relative to the exposed area of the piston 36, is small so that a small pressure applied at the control port to the piston shifts the barrier into an intermediate position that couples a third path through bore 39 in the barrier between the output port and the control port. Flow through this third path adds power assist to the small control port pressure to rapidly shift the barrier into the second position.

It should be clear to one skilled in the art that while the valve of FIG. 2 is particularly suited to the protection system shown in FIG. 1, the valve per se may be used as a remotely operated pilot valve in an application in which an increase in control pressure is desired to close the valve. The valve in accordance with the present invention has an added system draining feature which is not ordinarily found in pilot valves.

In all cases it is understood that the above described arrangements are merely illustrative of one embodiment of the invention and that numerous modifications thereof will readily occur to one skilled in the art.

I claim:

1. A hydraulic valve comprising a body having a cavity therein and four ports opening into said cavity,
    means slideably retained within said cavity for coupling a first path between the first and second of said ports on one side of said slideable means and for closing a second path between said first and a third of said ports when said slideable means is in a first position,
    means for applying fluid under pressure from a source to said second port for delivery to said first port,
    said slideable means forming a third path between said first port and a fourth port,
    said slideable means being moveable to a second position within said cavity for closing said first path and opening said second path, and
    means utilizing hydraulic pressure present at said first port for moving said slideable means to said second position,
    said means for moving comprising means connected to said fourth port for increasing hydraulic pressure on the other side of said slideable means to open said third path thereby applying pressure from said first port together with pressure from said fourth port to said other side of said slideable means,
    said other side having a larger effective area than said one side of said slideable means whereby unequal hydraulic forces are exerted upon opposite sides of said slideable means to produce a movement into said second position whereby said first path is closed between said first and second ports and whereby said second path is opened between said first and third ports.

2. The hydraulic valve of claim 1 wherein said means for increasing pressure at said fourth port is temperature dependent.

3. The hydraulic valve of claim 1 wherein said third path comprises an orifice extending through said slideable means.

4. The hydraulic valve of claim 3 including means for closing said orifice when said slideable means is in said first position.

5. A fluid containing system protected against extreme temperatures comprising a body having a cavity therein and three ports opening into said cavity,
    said protected system being connected to one of said ports, a source of fluid flow under pressure connected to a second of said ports, a drain for said fluids connected to a third of said ports,
    said body having a fourth port opening into said cavity,
    a barrier slideably retained within said cavity and adapted for selectively coupling said one port to either said second port or said third port,
    said barrier including an orifice for coupling said one port on one side of said barrier to the other side thereof and to said fourth port,
    means for closing said orifice,
    means utilizing hydraulic pressure present at said one port for reversing the coupling between said one port and said second and third ports,
    said means for reversing including thermally sensitive means for applying hydraulic pressure from the protected system to said fourth port to create unequal hydraulic forces on opposite sides of said barrier to move said barrier in the direction of said applied pressure and to open said orifice thereby further applying pressure from said one port to said other side of said barrier whereby said protected system is isolated from said source and said protected system is coupled to said drain.

6. The system according the claim 5 wherein the movement of said barrier opens said orifice before coupling said third port to said one port and said fourth port.

7. In a hydraulic valve having a valve seat through which fluid under pressure may flow, a valve closure member adapted to be received on said seat when said valve is in a fully closed position and removed from said seat when said valve is in a fully open position and a valve stem extending from said closure member,
    the improvement comprising
    a piston located upon the end of said valve stem remote from said closure member,
    a piston chamber enclosing said piston,
    an orifice extending through said closure member, through said valve stem, through said piston, and into said chamber,
    means for closing said orifice when said valve is in a fully open position,
    means including means for introducing hydraulic pressure into said piston chamber to move said piston for opening said orifice whereby hydraulic pressure present at said valve seat and exposed to said closure member is passed through said orifice into said piston chamber to act together with said introduced pressure to close said valve,
    and means for draining said piston chamber when said valve is in said fully closed position.

* * * * *